(No Model.)
J. J. PHILLIPS.
THILL COUPLING.
No. 603,966.   Patented May 10, 1898.
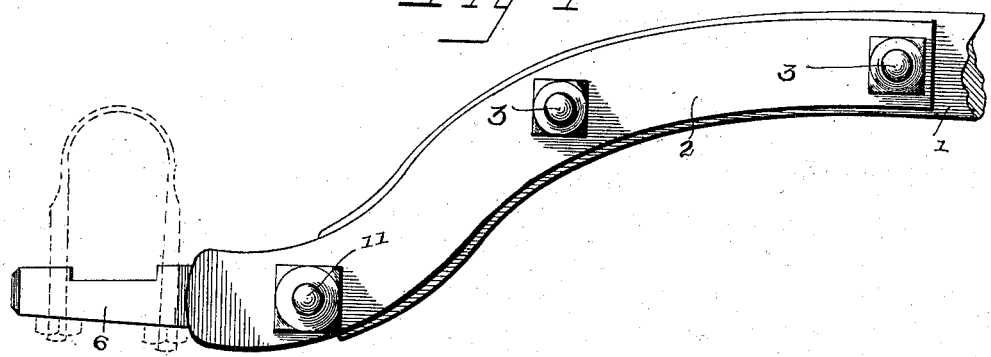
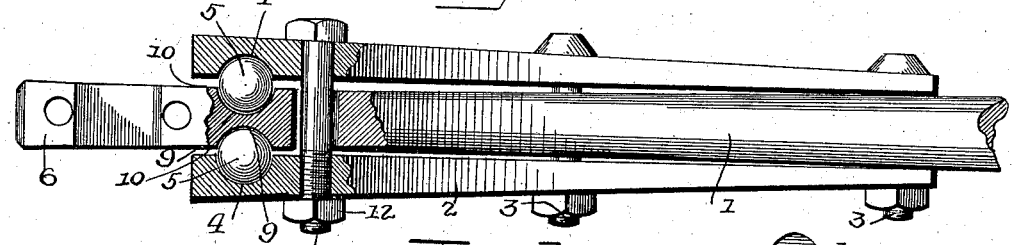
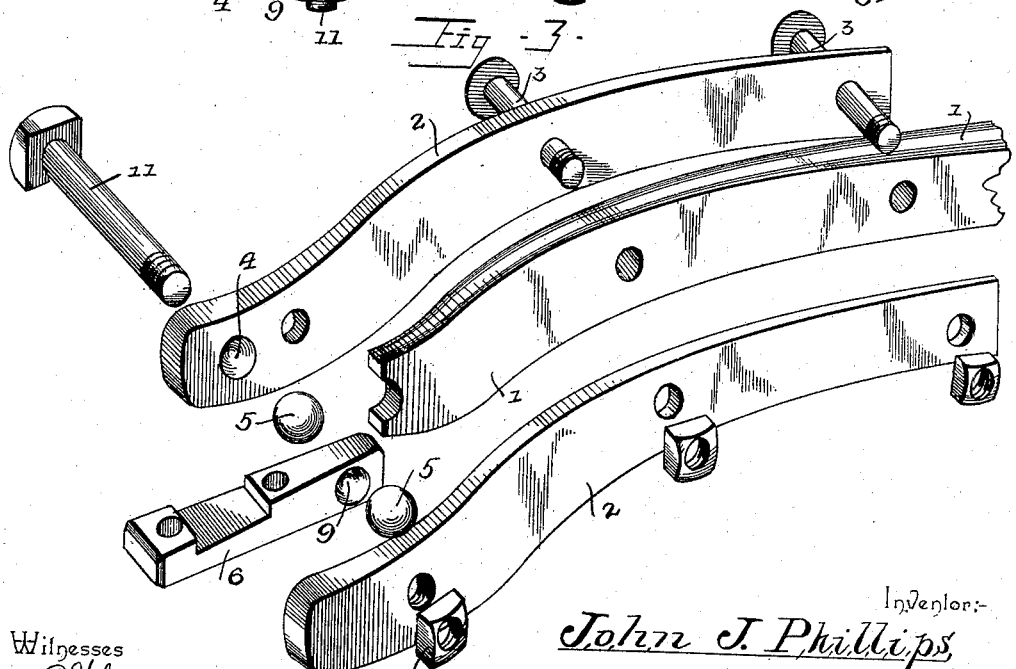
Witnesses
C. J. Young
V. B. Hillyard.
Inventor:
John J. Phillips,
By his Attorneys,
C. A. Snow & Co.

UNITED STATES PATENT OFFICE.

JOHN JONES PHILLIPS, OF GRAYSON, KENTUCKY.

THILL-COUPLING.

SPECIFICATION forming part of Letters Patent No. 603,966, dated May 10, 1898.

Application filed September 17, 1897. Serial No. 652,015. (No model.)

*To all whom it may concern:*

Be it known that I, JOHN JONES PHILLIPS, a citizen of the United States, residing at Grayson, in the county of Carter and State of Kentucky, have invented a new and useful Thill-Coupling, of which the following is a specification.

This invention aims to provide improved means for connecting a thill, pole, or tongue to the axle of a wagon or other vehicle which will be durable, obviate rattling, prevent the accidental disengagement of the pole or shafts and which will permit the wear between the relatively movable parts being easily taken up, so as to obviate looseness of joints and the noise incident thereto.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and for a full disclosure of the invention an adaptation thereof is shown in the accompanying drawings, in which—

Figure 1 is a side view of a thill-coupling embodying the essential features of this invention. Fig. 2 is a top plan view thereof, partly in section. Fig. 3 is a detail perspective view showing the component parts disassociated and arranged in about the position which they will occupy when assembled.

Corresponding and like parts are referred to in the following description and indicated in the several views of the drawings by the same reference characters.

The pole or thill is indicated at 1 and is provided at its sides with irons 2, secured thereto by bolts 3, passing transversely through registering openings in the thill and thill-irons. The thill-irons 2 project beyond the rear end of the part 1 and gradually thicken toward their rear ends and have semispherical sockets 4 in their inner faces which form seats for balls 5.

The yoke-plate or clip-iron 6 is applied to the lower end of the clip in the ordinary manner and is depressed in its top side to receive the axle, and its front end projects beyond the axle and enters the space between the rear ends of the thill-irons 2 and is provided in its sides with semispherical sockets 9, which receive the balls 5 and form with them and the sockets 4 ball-and-socket joints between the complementary parts of the coupling. The balls 5 are of hardened steel and are located upon opposite sides of the clip-iron 6 and connect the thill-irons therewith. A space 10 is formed between the opposing sides of the irons 2 and 6 to admit of the thill-irons being brought together to take up any wear in the ball-and-socket bearings, thereby maintaining a snug joint and obviating rattling. This space 10 extends between the sides of the part 1 and the thill-irons, so that the latter may be brought together to attain the objects specified. A bolt 11 passes through openings near the rear ends of the thill-irons and is the means for drawing the latter together, and its threaded end enters a threaded opening in one of the thill-irons, whereby the latter may be drawn together independently of the nut 12, which is mounted upon the projecting end of the bolt and acts simply in the capacity of a jam-nut to prevent the accidental loosening of the bolt.

The balls 5, in conjunction with the approximately semispherical sockets 4 and 9, afford effective means for connecting the parts of the coupling and can move so as to distribute the wear equally upon all parts and when worn can be easily and cheaply replaced by new ones, as will be readily understood.

Having thus described the invention, what is claimed as new is—

1. In a coupling for thills and the like, the combination of a clip-iron having semispherical sockets in its opposite sides in transverse alinement, a pole or thill, irons placed upon opposite sides of the pole or thill and projecting in the rear thereof and having corresponding semispherical sockets in their inner faces, balls seated in the sockets of the clip-iron and the irons secured to the pole or thill and adapted to turn loosely so as to bring different portions in position to sustain the wear and strain, and means for adjustably connecting the irons with the pole or thill so as to compensate for wear between the balls and sockets, substantially as and for the purpose set forth.

2. In a coupling for thills and the like, the combination of a clip-iron having semispherical sockets in its outer sides in transverse alinement, a pole or thill, irons placed upon opposite sides of the pole or thill and having their rear ends extending beyond the rear end thereof and formed in their inner faces with semispherical sockets to register with the corresponding sockets in the clip-iron, balls loosely fitted in the corresponding and registering sockets of the clip and thill irons, a bolt adjustably connecting the thill-irons in the rear of the pole or thill to take up wear, and other bolts adjustably connecting the thill-irons with the pole or thill, substantially in the manner set forth for the purpose described.

In testimony that I claim the foregoing as my own I have hereto affixed my signature in the presence of two witnesses.

JOHN JONES PHILLIPS.

Witnesses:
JOHN A. SCOTT,
WILLIAM STAMPER.